United States Patent
Schmidt et al.

(10) Patent No.: US 11,428,831 B2
(45) Date of Patent: Aug. 30, 2022

(54) TIME-GATED FAST NEUTRON TRANSMISSION RADIOGRAPHY SYSTEM AND METHOD

(71) Applicant: Lawrence Livermore National Security, LLC, Livermore, CA (US)

(72) Inventors: Andrea Schmidt, Livermore, CA (US); Maurice B. Aufderheide, Livermore, CA (US); David Neal Fittinghoff, Livermore, CA (US); James M. Hall, Livermore, CA (US); Yuri Podpaly, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 168 days.

(21) Appl. No.: 16/532,052

(22) Filed: Aug. 5, 2019

(65) Prior Publication Data

US 2020/0041672 A1   Feb. 6, 2020

Related U.S. Application Data

(60) Provisional application No. 62/715,179, filed on Aug. 6, 2018.

(51) Int. Cl.
*G01T 3/06* (2006.01)
*H05H 3/06* (2006.01)
*H05H 1/06* (2006.01)

(52) U.S. Cl.
CPC .......... *G01T 3/06* (2013.01); *H05H 1/06* (2013.01); *H05H 3/06* (2013.01)

(58) Field of Classification Search
CPC ............ G01T 3/06; H05H 1/06; H05H 3/06
See application file for complete search history.

(56) References Cited

U.S. PATENT DOCUMENTS

| | | | | |
|---|---|---|---|---|
| 4,398,294 A | * | 8/1983 | Miller | H01S 3/09 372/70 |
| 5,296,712 A | * | 3/1994 | Swanson | G01T 3/08 250/390.02 |
| 5,410,156 A | * | 4/1995 | Miller | G01V 5/0016 250/390.04 |
| 7,151,815 B2 | * | 12/2006 | Ruddy | G01V 5/0091 376/158 |
| 8,487,536 B1 | * | 7/2013 | Hagen | H05G 2/003 315/111.01 |

(Continued)

OTHER PUBLICATIONS

Mor, I., et al., "High spatial resolution fast-neutron imaging detectors for Pulsed Fast-Neutron Transmission Spectroscopy", May 20, 2009, JINST 4 P05016 (Year: 2009).*

Seki, Y. et al., "Fast neutron transmission imaging of the interior of large-scale concrete structures using a newly developed pixel-type detector", Jul. 25, 2017, Nuclear Inst. and Methods in Physics Research A 870, pp. 148-155 (Year: 2017).*

(Continued)

*Primary Examiner* — Blake C Riddick
(74) *Attorney, Agent, or Firm* — Harness, Dickey & Pierce, P.L.C.

(57) ABSTRACT

The present disclosure relates to a time-gated fast neutron transmission radiography system and method. The system makes use of a pulsed neutron source for producing neutrons in a plurality of directions, with at least a subplurality of the neutrons being directed at an object to be imaged. The system also includes a neutron detector system configured to time-gate the detection of neutrons emitted from the pulsed neutron source to within a time-gated window.

21 Claims, 6 Drawing Sheets

(56) References Cited

U.S. PATENT DOCUMENTS

| | | | | |
|---|---|---|---|---|
| 8,530,854 | B1* | 9/2013 | Derzon | G21B 3/00 250/423 R |
| 9,269,524 | B1* | 2/2016 | Galloudec | H05G 2/00 |
| 2008/0156997 | A1* | 7/2008 | Kearfott | G01V 5/0025 250/390.04 |
| 2009/0078881 | A1* | 3/2009 | Dangendorf | G01T 1/2914 250/390.11 |
| 2010/0215136 | A1* | 8/2010 | Rusnak | H05H 1/06 376/108 |
| 2011/0284750 | A1* | 11/2011 | Nakamura | G01T 3/06 250/362 |
| 2013/0064339 | A1* | 3/2013 | Miley | G21B 1/23 376/108 |
| 2015/0052886 | A1* | 2/2015 | Adams | F01C 21/08 60/512 |
| 2016/0189816 | A1* | 6/2016 | Czerwinski | G21G 1/02 376/189 |
| 2017/0018318 | A1* | 1/2017 | Radel | G21G 4/02 |

OTHER PUBLICATIONS

Ogren, K. et al. "Spectroscopic fast neutron transmission imaging in a treaty verification setting", Jan. 4, 2018, AIP Advances 8, 015205 (Year: 2018).*

D. Ress et al.—Neutron imaging of inertial confinement fusion targets at Nova, Review of Scientific Instruments 59, 1694 (1988); doi: 10.1063/1.1140136, AIP Publishing.

R. A. Lerche et al.—Neutron penumbral imaging of laser-fusion targets, Laser and Particle Beams (1991), vol. 9, No. 1, pp. 99-118, Cambridge University Press 0263-0346/91.

T. J. Sammons—EL Pinex Handbook, EG&G Energy Measurements Group San Ramon Operations EGG 1183-4229 Jan. 1982.

O. Delage et al.—Neutron penumbral imaging of inertial confinement fusion targets at Phébus a), Review of Scientific Instruments 66, 1205 (Feb. 1995); doi: 10.1063/1.1146007, American Institute of Physics.

N. Guler et al.—First downscattered neutron images from Inertial Confinement Fusion experiments at the National Ignition Facility, EPJ Web of Conferences 59, 13018 (2013), EDP Sciences.

* cited by examiner

TIME-GATED FAST NEUTRON TRANSMISSION RADIOGRAPHY SYSTEM AND METHOD

CROSS-REFERENCE TO RELATED APPLICATIONS

This application claims the benefit of U.S. Provisional Application No. 62/715,179 filed on Aug. 6, 2018. The disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Neutron imaging of stationary objects is a well-established field, and is similar to x-ray radiography: it allows the user to "look inside" objects to see what is inside or search for features or defects. However, most neutron radiography done currently is performed with long-pulse (multi-microsecond to millisecond pulse width) neutron sources and often with time-integrated screens/detectors. This type of neutron imaging is typically done without time gating since it may take many minutes or even hours to emit enough source neutrons to obtain an image.

In some somewhat unique neutron radiography experiments, performed on broad-spectrum (not monoenergetic) neutron sources, time gating has been used to make successive images of different energy transmission neutrons. However, in this case it was not used for the purpose of increasing signal-to-noise ratio, nor would it be possible to do so with a broad-spectrum source. To our knowledge, experiments of this nature have been performed on the Los Alamos Neutron Science Center (LANSCE), a spallation neutron source.

Additionally, time gating has been used for coded aperture imaging of the neutron source on the National Ignition Facility (NIF) at Lawrence Livermore National Laboratory (LLNL), to image the neutron spot shape and to understand scattering material near the neutron spot. This class of experiments is not transmission neutron radiography and was used to characterize a neutron source, not to "look through" a secondary object. The time gating was not used to increase the signal-to-noise ratio of the resulting images, but rather to create several images of neutrons of different energies, emanating from a source. Outside of radiography, time histories have commonly been recorded for "1-dimensional" neutron time-of-flight ("nToF") diagnostics. nToF measurements do not result in an image, but rather a time-history of signal levels on a single detector. In theory these signals can be divided up into arbitrary time segments. Typically, this would be used to obtain a neutron spectrum, not to increase the signal-to-noise ratio.

SUMMARY

This section provides a general summary of the disclosure, and is not a comprehensive disclosure of its full scope or all of its features.

In one aspect the present disclosure relates to a time-gated fast neutron transmission radiography system. The system may comprise a pulsed neutron source for producing neutrons in a plurality of all directions, with a subplurality of the neutrons being directed at an object to be imaged. A neutron detector system may be included which is configured to time-gate the detection of neutrons emitted from the pulsed neutron source to within a time-gated window.

In another aspect the present disclosure relates to a time-gated fast neutron transmission radiography system. The system may comprise a pulsed neutron source for producing neutrons, with at least a subplurality of the emitted neutrons being directed at an object to be imaged, the pulsed neutron source generating pulse lengths of the emitted neutrons, wherein the pulse lengths are each shorter than 100 nanoseconds. A neutron detector system may be included which is configured to time-gate the detection of neutrons emitted from the pulsed neutron source to within a predetermined, time-gated window, to exclude substantially all neutrons emitted from the pulsed neutron source which are scattered before reaching the neutron detector system. An electronic controller may be included which is configured to control operation of the pulsed neutron source and the neutron detector system to achieve time gating of the neutron detector system in accordance with the predetermined, time gated window.

In still another aspect the present disclosure relates to a method for radiographically imaging an object. The method may comprise using a pulsed transmission neutron source to emit a pulse of neutrons, with at least a subplurality of the neutrons being directed toward the object. The method may further include using a time-gated neutron detector system to limit a detection of the neutrons emitted from the pulsed transmission neutron source to only those ones of the emitted neutrons that reach the time-gated neutron detector system within a time-gated window.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. In the drawings.

DETAILED DESCRIPTION

Example embodiments will now be described more fully with reference to the accompanying drawings.

The present disclosure relates to systems and methods for neutron radiography which involve a time-gated technique. The time gated technique may be implemented using a short duration pulse, for example a short duration pulse neutron source (e.g., a <100 nanoseconds pulsed neutron source).

Figure 1:
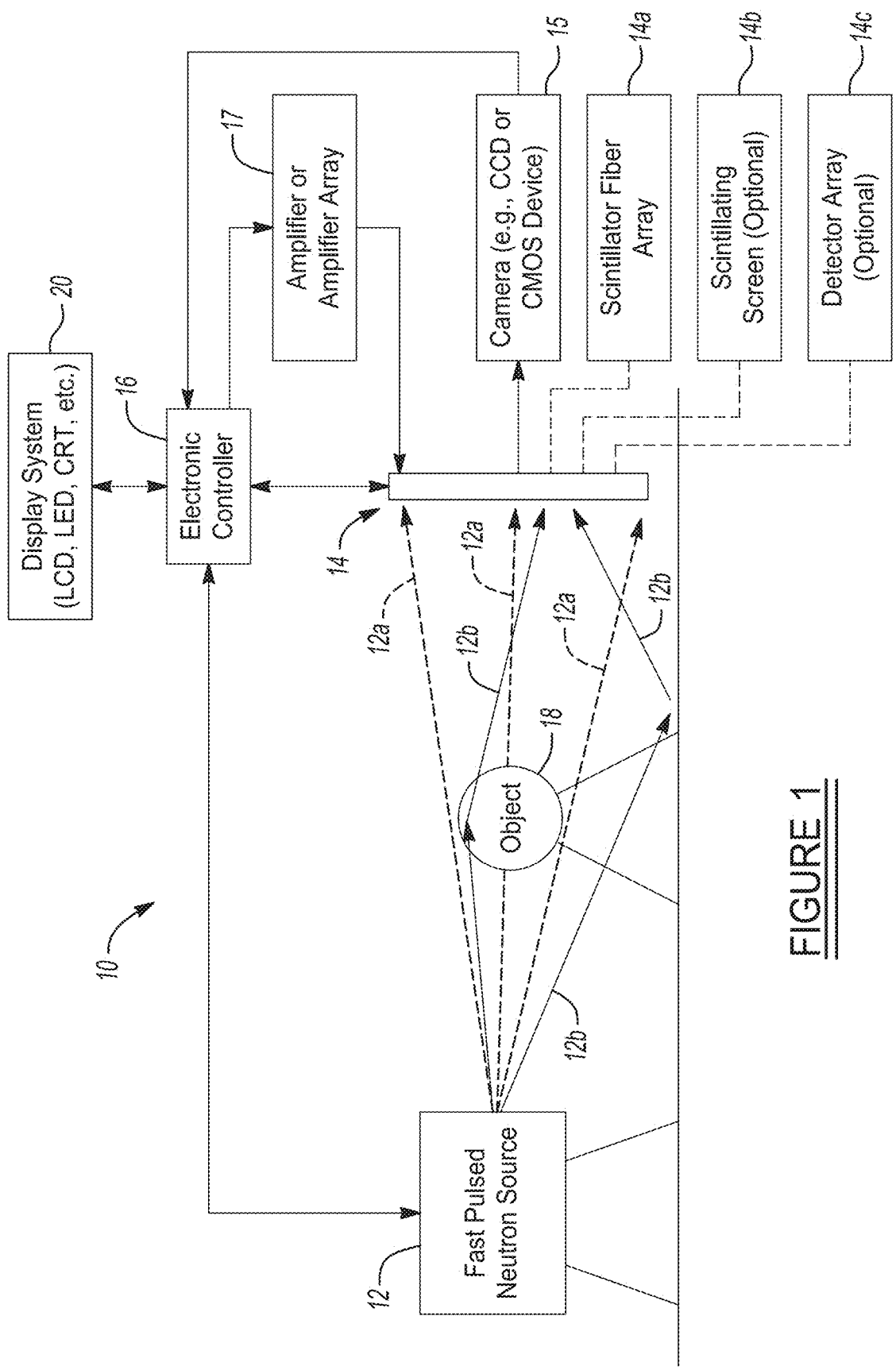
FIG. 1 is a high level schematic representation of one embodiment of a system in accordance with the present disclosure.

Referring to FIG. 1, one embodiment of a time-gated, short duration neutron transmission radiography system 10 is shown in accordance with the present disclosure (hereinafter simply "system 10"). The system 10 may include a neutron source 12, a detector system 14, and an electronic controller 16 in communication with both the neutron source 12 and the detector system 14. An object 18, which is not part of the system 10, is the structure being imaged using the neutron source 12 in this example. The neutron source 12 is preferably a short pulse (<100 nanoseconds) neutron source for producing neutrons, which typically emits neutrons in all directions, such that at least a subplurality of the emitted neutrons will be directed at the object 18 being imaged. The object 18 may be any form of object (e.g., suitcase, box, container, clothing covered body part, or other inanimate object). A display system (e.g., LCD, LED, CRT, etc.) 20 may be in communication with the controller for displaying an image created using the information supplied by the detector system 14 to the electronic controller 16.

The detector system 14 may comprise, for example, a scintillator fiber array 14a, or optionally a scintillating screen 14b, or optionally a detector array 14c. Whichever subsystem is used, the detector system 14 is capable of creating the optical signals which can then be recorded by a suitable device (e.g., CCD) to produce an image, and with a sufficiently fast rise-time, that it can be gated on the nanosecond time scale. For example, a scintillator fiber bundle could be obtained commercially through the vendor Saint Gobain, Courbevoie, France. For convenience, the use of the term "detector system 14" will be understood to encompass any one of the scintillator fiber array 14a, the scintillating screen 14b or the detector array 14c, or any other suitable detector-like component capable of being gated on the nanosecond time scale.

The fast gating needed may be enabled by coupling the detector 14 detector, for example, to a gated camera 15. The camera 15 may be a charge coupled display (CCD) device or possibly a CMOS device, or any other suitable subsystem. The fast gating may also be accomplished through another means, such as time gating of voltage on an amplifier or amplifier array 17. For example, a microchannel plate (MCP) could be used as an amplifier. The combination of any one of the scintillating fiber array 14a, or the scintillating screen 14b or the detector array 14c, plus the gating device (e.g., CCD camera 15, time gating of voltage on an amplifier or amplifier array 17) may be understood, in various embodiments, as all forming portions of the detector system 14.

In the example shown in FIG. 1, the neutron source 12 is directed toward the object 18 and the detector system 14 is situated on the opposite side of the object from the source. Distances between the neutron source 12 and the object 18 could be variable, but in one example the distance may be approximately one meter to obtain an image in a reasonable amount of time (e.g., typically within a few minutes or preferably under a minute). Distances between the object 18 and the screen/detector array of the detector system 14 could be variable but might be approximately one meter. The optimal distances may be a function of a plurality of variables including, but not necessarily limited to, the neutron source 12 spot size, the neutron source pulse length, the energy spread in neutrons originating from the neutron source, the optical depth of the object 18, and the desired resolution and field-of-view for the resulting image.

During operation of the system 10 the neutron source 12 may be pulsed. Pulsing of the neutron source 12 may be by suitable control signals from the electronic controller 16 or another device. The detector system 14 is time gated by the electronic controller 16 in such a way so that the detector system begins collecting neutrons a short predetermined time delay period after when the neutron source 12 is pulsed on, and stops collecting signal (i.e., neutrons) when most of the transmitted directly received (i.e., non-scattered) neutrons have arrived at the detector system 14, which will be before the great majority of the slower scattered neutrons arrive at the detector system. In this regard it will be appreciated that the detector system 14 may be operated in standby mode, and triggered to turn fully on at the end of the predetermined time delay period. The predetermined time delay period may vary to meet a specific application, but in one example the predetermined time delay may range from about 50 ns-150 ns.

After the neutron source 12 is triggered to begin emitting neutrons, some of the source neutrons emitted will pass through and around the object 18, as indicated by lines 12a, without scattering, while other emitted ones of the source neutrons will scatter in the object or off of other nearby surfaces (i.e., floor, walls, ceiling, other objects in proximity to the object 18, etc.), as indicated by lines 12b. A rough estimate of the end of a time gated window during which the detector system 14 collects neutrons can be obtained in part on the expected time of flight to the detector system 14 based on the energy/speed of neutrons exiting the neutron source 12, as well as from knowledge of the neutron source's pulse length. The exact time for the time gated window to end may be determined empirically or through modeling in order to optimize the signal-to-noise ratio of the collected signal. A longer time gating window will allow for more complete collection of signal but will also introduce more noise by allowing some scattered neutrons to contribute to the detected signal. A shorter time gated window will more effectively eliminate noise from scattered neutrons but may result in collecting less of the directly transmitted neutrons that make up the signal. The time-gated window of the detector system 14 may begin as soon as neutrons from the neutron source 12 arrive at the detector system, or even earlier, if the additional signal collected before first neutron arrival is determined to be negligible.

Because neutrons lose energy when they scatter, the scattered neutrons (represented by lines 12b) are moving slower than the direct neutrons (represented by line 12a). Thus, they take longer to reach the detector system 14 than the direct neutrons. However, since the neutron source 12 has a finite pulse length, and the neutrons it emits have a small energy spread, the direct neutrons do not all arrive at the detector system 14 at the exact same time. In most implementations of the system 10, it is expected that there will be some period of time during which both scattered and direct neutrons can arrive at the detector system 14. The time gating window may be chosen to optimize the signal-tonoise ratio, and this may depend in part on the surroundings of the environment in which the system 10 is being used.

Figure 2:
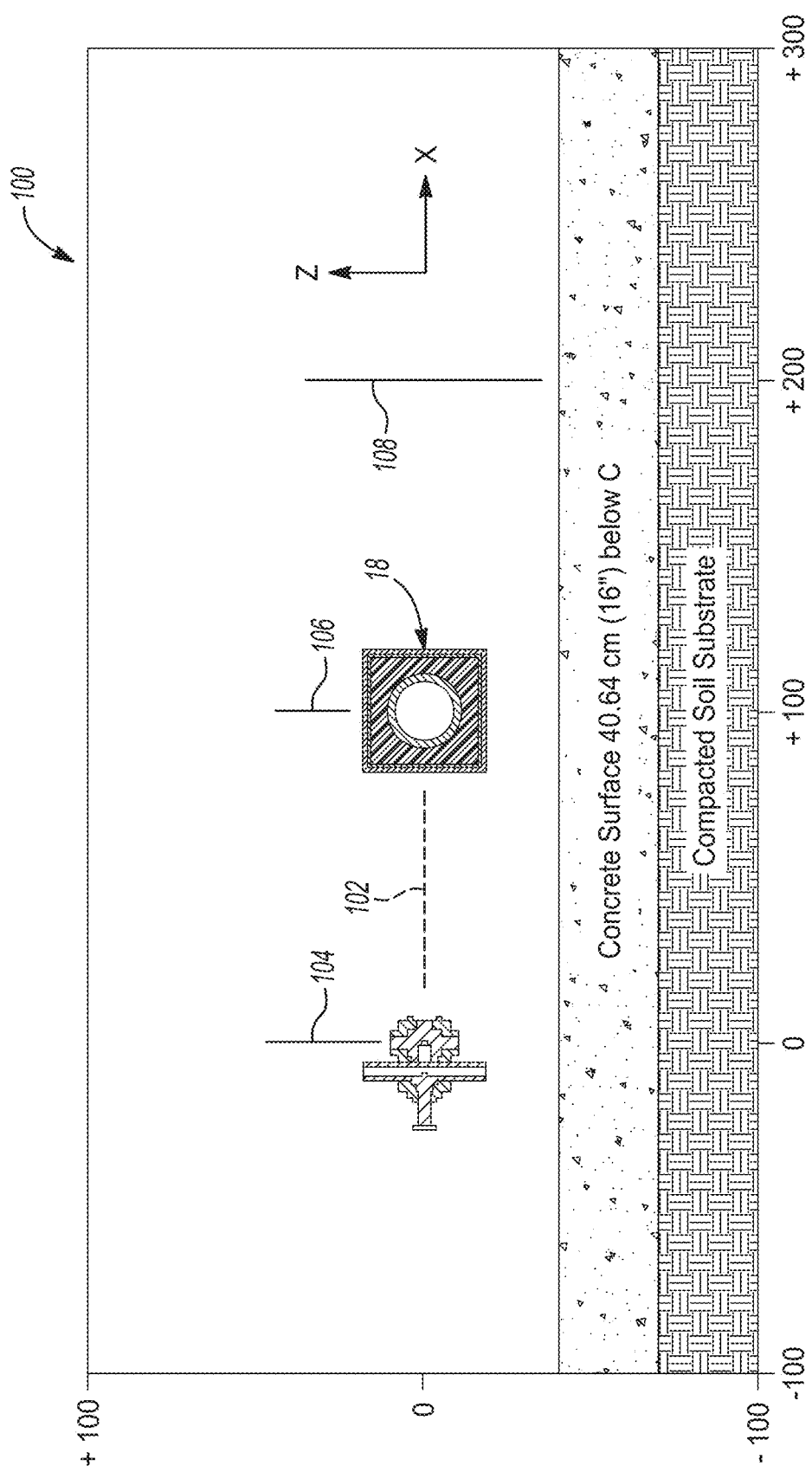
FIG. 2 is a 2D diagram of a 3D model used to test the system of FIG. 1.

An example of how image quality can be improved through use of the time gating window implemented with the system 10 is shown in the diagram 100 of FIG. 2, This example was modeled in the Monte Carlo N-particle (MCNP) code. The model uses $1 \times 10^{10}$ source neutrons distributed into $4\pi$ steradians. The neutrons have a mean energy of 14 MeV and an energy spread of 50 keV. The neutron spot is a 3.4 mm diameter by 1 cm long cylinder, with the axis of the cylinder oriented along the source-object axis, indicated in simplified form by dashed line 102. The model used was a 3D model, but FIG. 2 depicts a 2D cross-section representation of the modeled objects, wherein the source plane is represented by 104, the object plane is represented by 106 and the detector system 14 image plane is represented by 108.

Figure 3:
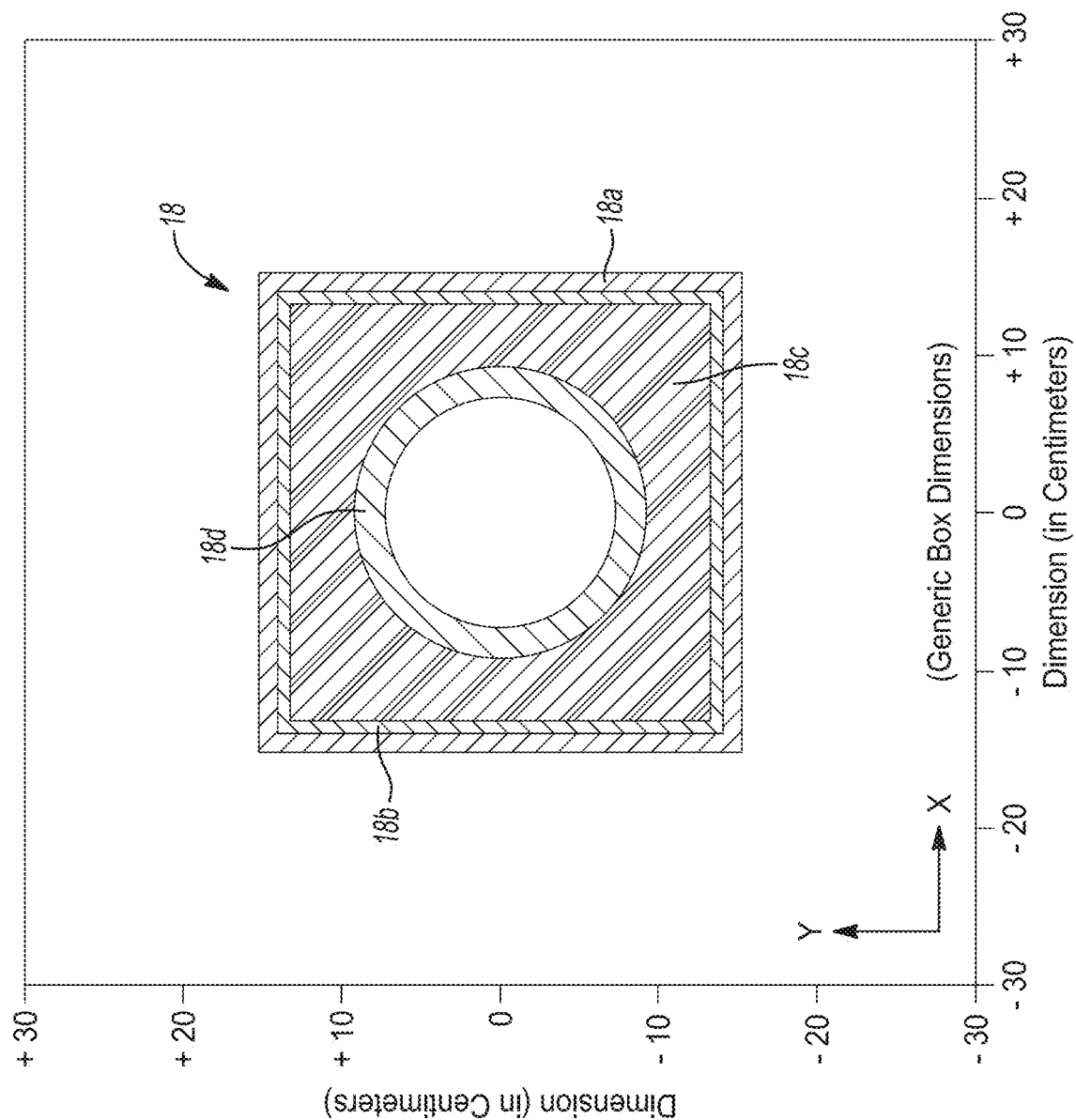
FIG. 3 is a more detailed 2D illustration of the construction of the object used in the model of FIG. 2.

A more detailed diagram of the test object 18 used in the model shown in FIG. 2 is shown in FIG. 3. The test object 18 in this example had an outer wood casing about 0.5 inch thick (1.27 cm) 18a, a lead liner 18b having a thickness of about 0.25 inch (0.635 cm), a low-density polyethylene fill interior portion 18c, and a depleted uranium shell 18d with a thickness of about 5.08 inches thick (2 cm). The time gating window was chosen by looking at the simulated arrival time of neutrons at the detector system 14 image plane 108. The earliest neutrons to arrive are the unscattered ones. Then there is a time window during which both scattered and direct neutrons arrive. After a certain time, all of the direct neutrons have already made it to the detector and the remaining neutrons to arrive are all scattered.

Figure 4:
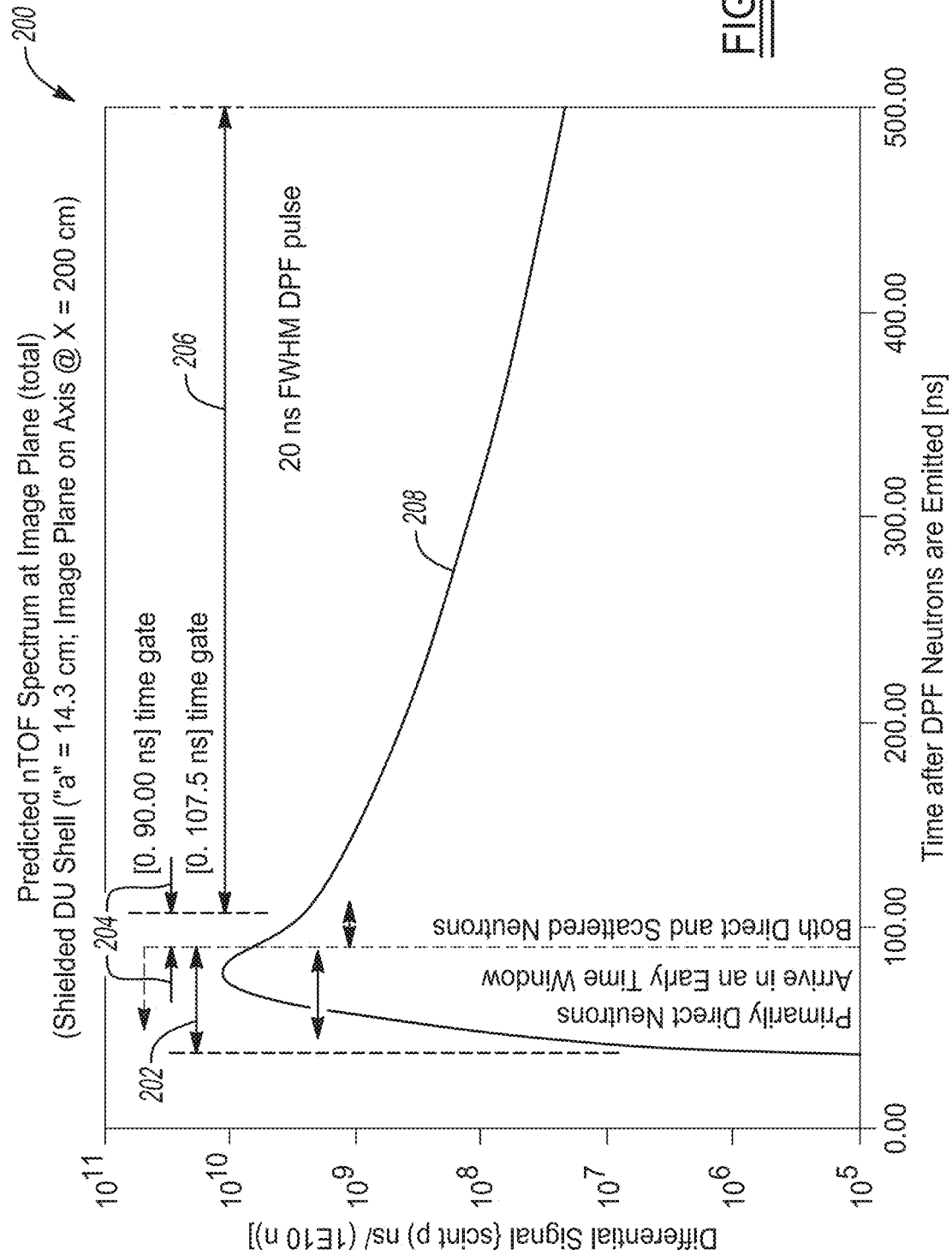
FIG. 4 is a plot 200 of the number of neutrons arriving at the detector system image plane versus time, for both directly received neutrons and scattered neutrons.

FIG. 4 shows a plot 200 of neutrons arriving at the detector system 14 image plane 108 as a function of time. The X axis represents the time after a DPF device (Dense Plasma Focus device) neutron pulse is emitted, and the Y axis represents the differential signal collected (i.e., how many photons are generated from neutron interactions in the scintillating fiber array 14a (or optionally the scintillating screen 14b or detector array 14c) every nanosecond. The time window represented by arrow 202 represents an "early" time window in which primarily direct neutrons arrive at the detector plane 108 (shown in FIG. 2). Arrows 204 represent a second time window immediately after the early time window 202 in which a small number or direct neutrons are received at the detector plane along with a quantity of scattered neutrons. Arrow 206 represents a third time window after the second time period in which only scattered neutrons are received. Curve 208 shows that the great majority of directly received neutrons are received in the early time window represented by arrow 202, with only a small number being received in the second time window 204. Very few, if any, directly received neutrons are received in the third time window represented by arrow 206.

Figures 5A, 5B, 5C:
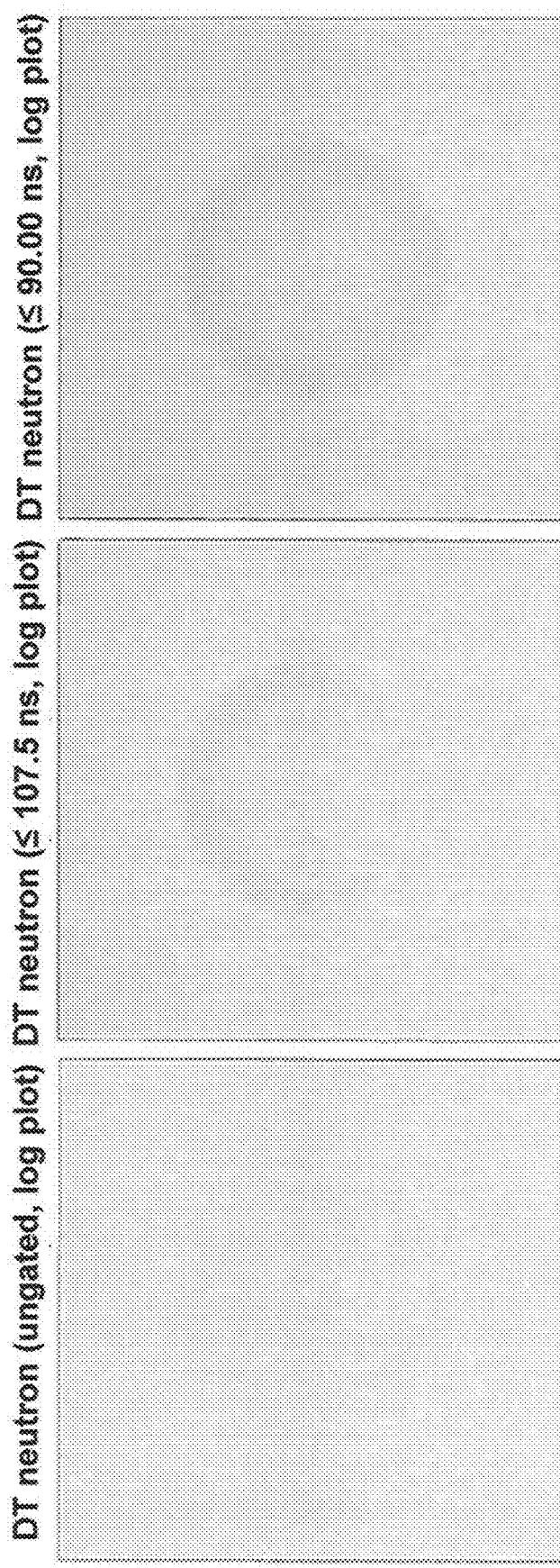
FIG. 5a-5c show simulated images obtained from an ungated collection of neutrons (FIG. 5a), as well as two different time gates, 107 ns (FIG. 5b) and 90 ns (FIG. 5c), which illustrate that both time gates (FIGS. 5b and 5c) show superior contrast to the ungated image of FIG. 5a, with the 90 ns time gate (FIG. 5c) showing the best contrast.

FIGS. 5a-5c show simulated images obtained from an ungated collection of neutrons (FIG. 5a), as well as two different time gates, 107 ns (FIG. 5b) and 90 ns (FIG. 5c). Both the 107 ns and 90 ns time gates show superior contrast to the ungated image (FIG. 5a), though the 90 ns time gate shows the best contrast. The time gate in these examples was not optimized for best signal-to-noise in these simulations, and it is expected that optimizing for best signal-to-noise performance will further improve the contrast shown in FIGS. 5b and 5c.

Figure 6:
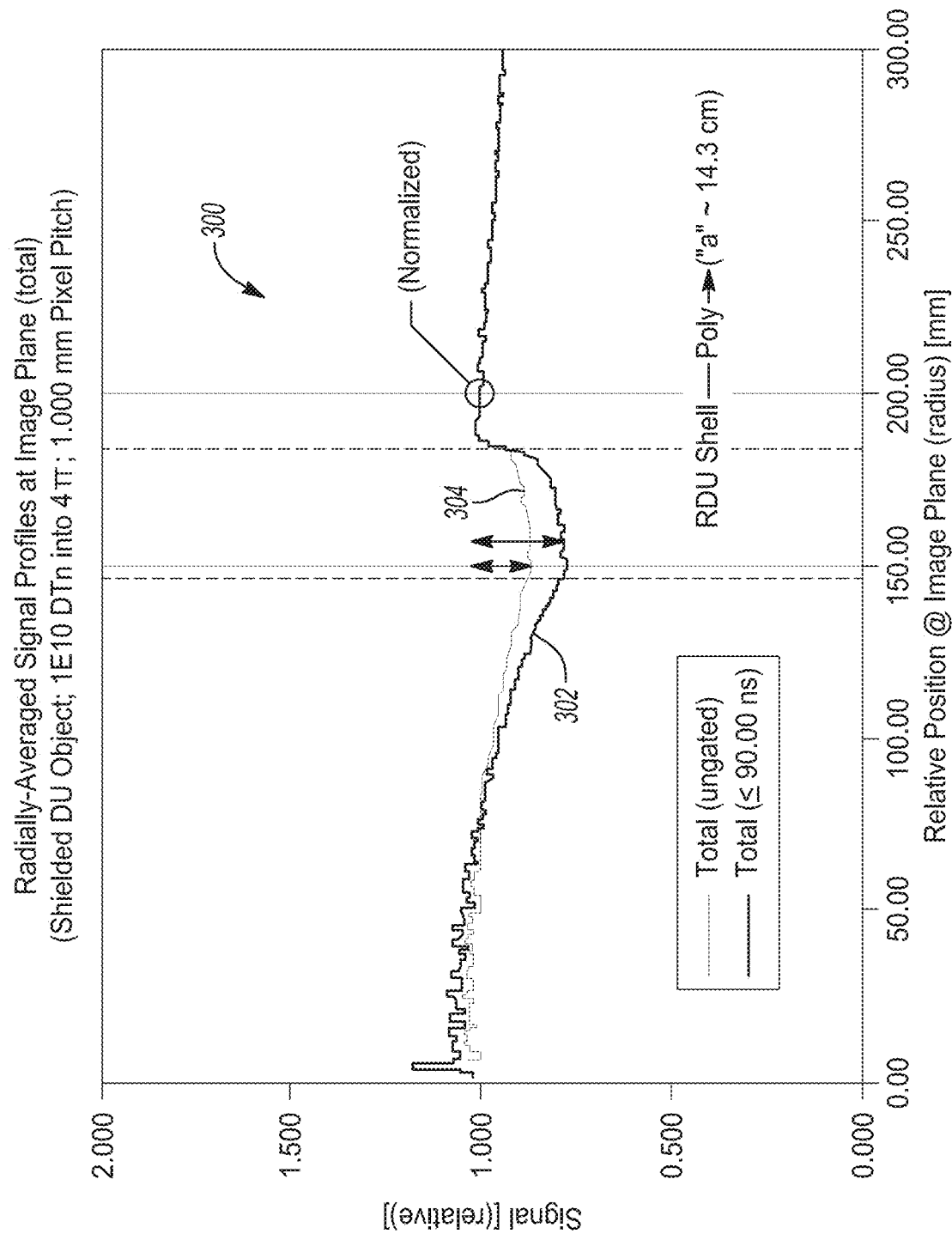
FIG. 6 is a graph illustrating a radially-averaged line-out of the 90 ns gated image of FIG. 5c, as well as a radially-averaged line-out of the ungated image of FIG. 5a, to further illustrate the increased contrast provided by the 90 ns gated image.

FIG. 6 shows a graph 300 illustrating a radially-averaged line-out 302 of the 90 ns gated image of FIG. 5c, as well as a radially-averaged line-out 304 of the ungated image of FIG. 5a. Viewing the 90 ns gated image represented by line-out 302 in comparison to the ungated image represented by line-out 304 further illustrates the superior contrast obtained in the gated image. This 90 ns gated image has been normalized to better show the signal-to-noise advantage that the gating provides.

In practice, the various embodiments of the present disclosure may also be implemented using a longer duration pulse neutron source. The disadvantage of using a longer pulse source is that most of the source neutrons would be "thrown away" or not used to create the image because the gating time is too short. Time gating to reduce scatter also requires a monoenergetic or substantially monoenergetic neutron source. This is so that the unscattered source neutrons all appear at the image plane at nearly the same time, so that slower, scattered neutrons can be time gated out, which is important for increasing signal-to-noise of the resulting signal collected by the neutron detector system 14.

The gating used with the system 10 significantly increases the signal-to-noise ratio of the measured signal by effectively removing a significant majority of the scattered neutrons from the signal received by the detector system 14. The end result is a significantly contrast-enhanced image of objects that are inspected using the system 10.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

We claim:

1. A time-gated neutron transmission radiography system, comprising:
   a pulsed neutron source for producing neutrons in a plurality of directions, with a subplurality of the neutrons being directed at an object to be imaged; and
   a neutron detector system configured to time-gate the detection of neutrons emitted from the pulsed neutron source to within a time-gated window; and
   wherein the time-gated window is selected to capture neutrons passing through the object, which have a first time of flight, and further such that the time-gated window is closed before scattered neutrons having a second time of flight longer than the first time of flight, reach the neutron detector system.

2. The system of claim 1, wherein the pulsed neutron source comprises a mono-energetic pulsed neutron source.

3. The system of claim 1, wherein the pulsed neutron source comprises a dense plasma focus (DPF) device.

4. The system of claim 1, wherein the pulsed neutron source further comprises a pulsed neutron source configured to emit neutrons within a pulse length of less than 100 nanoseconds.

5. The system of claim 1, further comprising an electronic controller configured to control operation of the neutron source and the neutron detector system to achieve time gating of the neutrons detected by the neutron detector system in accordance with the time-gated window.

6. The system of claim 5, further comprising a display in communication with the electronic controller for displaying an image representing at least a portion of the object being imaged.

7. The system of claim 6, wherein the display comprises at least one of a liquid crystal display (LCD), a Light emitting diode (LED) display or a cathode ray tube (CRT) display.

8. The system of claim 1, further comprising a charge coupled device (CCD) in communication with the neutron detector system.

9. The system of claim 1, wherein the neutron detector system comprises at least one of an amplifier or detector array which is controlled by time gating a voltage being applied thereto, to control time-gating of the neutron detector system.

10. The system of claim 9, wherein the neutron detector system comprises an amplifier, the amplifier comprising a microchannel plate device.

11. A time-gated neutron transmission radiography system, comprising:
- a pulsed neutron source for emitting neutrons, at least a subplurality of the emitted neutrons being directed at an object to be imaged, the pulsed neutron source generating pulse lengths of the emitted neutrons, wherein the pulse lengths are each shorter than 100 nanoseconds;
- a neutron detector system configured to time-gate the detection of the neutrons emitted from the pulsed neutron source to within a predetermined, time-gated window, the time-gated window selected to enable the neutron detector system to capture neutrons passing through the object which have a first time of flight, and to exclude neutrons emitted from the pulsed neutron source which are scattered before reaching the neutron detector system, and which have a second time of flight longer than the first time of flight; and
- an electronic controller configured to control operation of the pulsed neutron source and the neutron detector system to achieve time gating of the neutron detector system in accordance with the predetermined, time gated window.

12. The system of claim 11, wherein the pulsed neutron source comprises a z-pinch device.

13. The system of claim 12, wherein the pulsed neutron source comprises a dense plasma focus (DPF) device.

14. The system of claim 11, further comprising a charge coupled device (CCD) forming a camera, which is in communication with the neutron detector system.

15. The system of claim 11, wherein the neutron detector system includes at least one of:
- a scintillator fiber array; or
- a scintillating screen; or
- a detector array.

16. The system of claim 11, further comprising a display for displaying an image in accordance with information recorded by the neutron detector system.

17. The system of claim 16, wherein the display is in communication with the electronic controller and comprises at least one of a liquid crystal display (LCD) device, a light emitting diode (LED) display device, or a cathode ray tube (CRT) display device.

18. A method for radiographically imaging an object, comprising:
- using a pulsed transmission neutron source to emit a pulse of neutrons, at least a subplurality of the neutrons being emitted toward the object; and
- using a time-gated neutron detector system to implement a time-gated window to enable the time-gated neutron detector system to detect neutrons passing through the object, which have a first time of flight, the time-gated window being of a duration to limit detection of scattered neutrons by the time-gated neutron detector system which have a second time of flight longer than the first time of flight, and which arrive at the time-gated neutron detector system after the neutrons having the first time of flight.

19. The method of claim 18, wherein using a neutron pulsed transmission neutron source comprises using a mono-energetic pulsed neutron source.

20. The method of claim 18, wherein using a neutron pulsed transmission neutron source comprises using a z-pinch device.

21. The method of claim 20, wherein using a z-pinch device comprises using a dense plasma focus device.

* * * * *